Patented Dec. 8, 1931

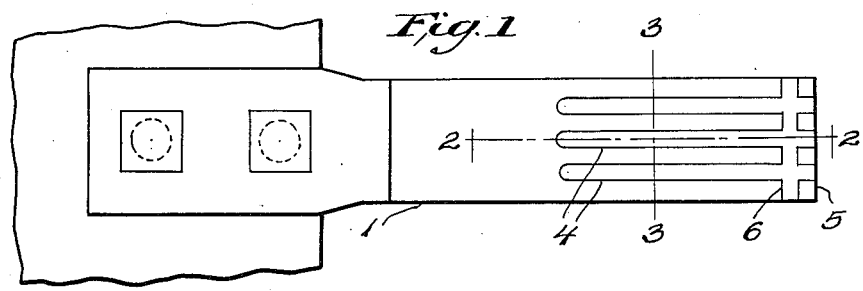
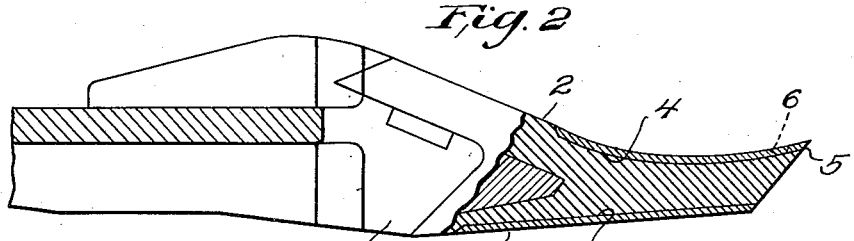
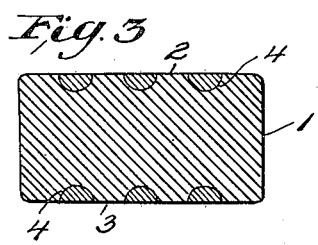
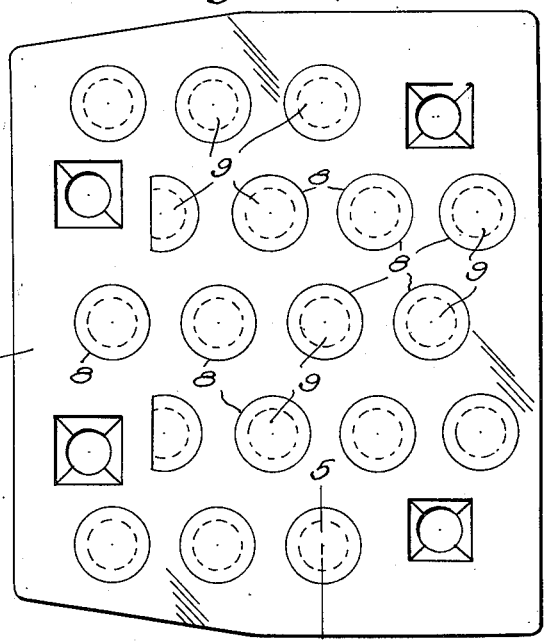
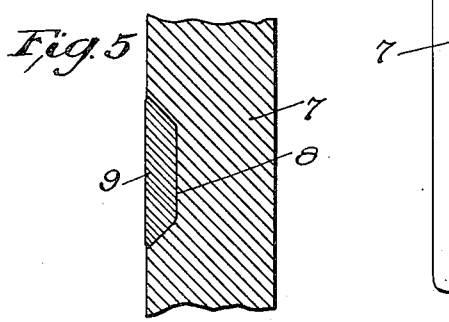
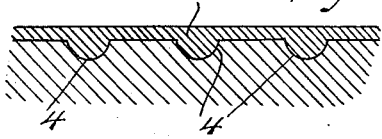

1,835,701

UNITED STATES PATENT OFFICE

GLENN E. EDMUNDS, OF COLUMBUS, OHIO, ASSIGNOR TO THE BONNEY-FLOYD COMPANY, OF COLUMBUS, OHIO, A CORPORATION OF OHIO

EXCAVATING IMPLEMENT

Application filed January 23, 1930. Serial No. 422,917.

This invention relates to an improved method for applying wear-resisting alloys to metallic surfaces or machine parts which are, in use, subjected to friction, abrasion and other conditions tending to wear and render the same unfit for efficient service.

It has long been known that, for parts of machinery which must withstand severe wear, abrasion and shocks, a relatively soft body of material such as steel, coated or surfaced with a much harder material, gives longer service and superior results. The relatively softer body material has ideal properties to withstand shock without fracture, while the very hard surface will withstand abrasion and wear to which it is subjected in use. Particular instances of machine parts to which the present invention is applicable are, among others, dipper teeth, bucket lips, tool points, well drilling bits, conveyor parts, crushing rolls and the like. In most cases these parts are made up of a relatively soft base metal such as cast, rolled or forged carbon or alloy steel possessing inferior abrasion resisting properties. Then, in order to increase the life of such parts, it has been the practice to weld upon the wear receiving surfaces of such parts an alloy composed of metals which resist abrasion and wear to a far greater degree. Such an alloy has been described in the co-pending application of H. Alton Mitchell and Alfred W. Gregg, filed January 16, 1930, Serial No. 421,306, although the present invention permits of the use of any preferred wear resisting alloy.

It has generally been the custom in the application of such wear resisting alloys to produce the same in the form of a welding rod, and then through the medium of heat these rods are fused so that the molten metal flows over these surfaces which are to be protected. This heating may be done either by electric arc welding or by oxy-acetylene welding. These alloys are rather brittle and when thus applied by welding in the form of plasters, wafers or slabs the same have a tendency to spall, crack or break and to leave the underlying metal unprotected.

I have found that by providing the base of softer metal with a plurality of grooves or depressions and welding the wear-resisting alloy in these grooves or depressions, a far stronger construction is produced wherein the objectionable conditions above noted are eliminated. I have found that by applying the wear-resisting alloy in this manner, the said alloy (which is around 700° Brinell hardness) is protected by the softer metal which forms the walls of the grooves and depressions, thus preventing the wear-resisting material from spalling, cracking and breaking off.

For a further understanding of the invention reference is to be had to the following description and the accompanying drawings wherein:

Figure 1 is a top plan view of an excavator tooth illustrating the method of applying my wear-resisting alloy in accordance with the present invention, Figure 2 is a vertical longitudinal sectional view through the tooth on the line 2—2 of Figure 1, Figure 3 is a transverse sectional view on the line 3—3 of Figure 1, Figure 4 represents a plan view showing one method of applying a wear-resisting alloy, Figure 5 is a vertical sectional view on the line 5—5 of Figure 4, and Figure 6 is a view in vertical section corresponding to Figure 3, illustrating one method of applying the wear-resisting alloy to the surface of metal.

In Figures 1 to 3 the numeral 1 designates a tooth of the type commonly found in connection with excavating dippers which has been here selected for illustration and description for the reason that it furnishes a clear example of one of the many machine parts to which the present invention is applicable. Of course, it will be obvious that the invention has application to any metallic wear-resisting body wherein it is desired to prolong the life of such a body or part by the application thereto of a hard wear-resisting material.

In this instance the upper and lower surfaces 2 and 3 of the tooth 1 are provided with a plurality of parallel grooves 4 which are united near the outer cutting edge 5 of the tooth by transversely extending grooves 6. In accordance with the present invention the wear-resisting alloy, which is usually produced in the form of a rod, is heated by electric or oxy-acetylene welding operations so that the metal flows from the end of the rod in a molten state and deposits itself in the grooves shown at 4 and 6 where it becomes in effect an integral part of the softer metallic body. The weld may be built up well above the surfaces 2 and 3 so that grinding will remove incidental impurities and will bring the upper surface of the welded strips substantially flush with the surfaces 2 and 3. By this method of application the wear-resisting material is protected by the softer material constituting the body of the tooth 1 so that the wear-resisting alloy is prevented, during the use of the article, from spalling, cracking or breaking off. By the provision of the grooves and depressions waste of the alloy at time of application is prevented, since the grooves serve to indicate the quantity of the alloy which should be employed and whereas if the latter is applied to an ordinary plane surface, as is customary, the operator has no reliable gauge by which to determine the proper quantity of material to be applied. Since these hardening alloys consist of relatively expensive materials the saving of the quantity thereof used for certain given operations is a matter of very great practical importance.

Furthermore, the invention has the advantage of permitting the very rapid application of the alloy to the softer material, since the grooves are well defined and the work of the welder is accordingly simplified.

In Figures 4 and 5, a wear-resisting crushing plate 7 has been set forth which has its upper surface, or its wear-receiving surface, provided with a plurality of spaced circular depressions 8 in which the welding material 9 is received. It will be understood, therefore, that the shape of the grooves or depressions and their relative arrangement will vary in accordance with the article or body to which the welding material is to be applied, and the present invention is not limited to a groove, pocket or depression of any particular formation or specific arrangement.

In Figure 6 the wear resisting alloy, instead of being ground flush with the surface of the metal body, is built up in the form of a layer of appreciable thickness to cover the surface of said body, as indicated at 10. It will be understood that by the provision of the grooves 4 the wear resisting material is locked or fashioned in the body so that the strains and jolts imparted to the alloy when so applied will not permit of spalling or breaking of the alloy and its extensive removal from the metallic body which it protects. In other words, the groves serve in the capacity of anchoring channels and prevent shifting or movement of the applied alloy.

What is claimed is:

1. An excavating implement having a metallic wear-receiving surface formed with grooves or channels therein spaced from one another, a body of metallic alloy having a greater hardness than the metal of said wear-receiving surface welded into said grooves or channels, said grooves or channels being filled with said body of alloy to a plane substantially even with said surface.

2. An excavating tooth having upper and lower wear-receiving surfaces formed with spaced longitudinally extending grooves or channels, an alloy of greater hardness than the body of the tooth positioned within said grooves or channels and fused to the side walls thereof, said alloy within said grooves or channels being substantially even with said surfaces and protected on each side by the comparatively softer metal forming the body of said tooth.

3. An excavating tooth having a wear-receiving surface formed with a plurality of longitudinally extending grooves or channels, an alloy containing metals of greater hardness than the body of the tooth positioned within said grooves, said grooves with alloy therein forming spaced rolls protected by the comparatively softer metal forming the body of said tooth.

4. An excavating tooth having a wear-receiving surface formed with a plurality of spaced longitudinally extending grooves or channels, said grooves having their outer ends terminating at the outer end of said tooth, a groove extending transversely of said tooth and near the outer end thereof, said transverse groove connecting the longitudinally extending grooves, and an alloy or material filling said grooves and having its surface substantially flush with said wear-receiving surface of said tooth.

In testimony whereof I affix my signature.

GLENN E. EDMUNDS.